(12) United States Patent
Briand

(10) Patent No.: US 11,142,324 B2
(45) Date of Patent: Oct. 12, 2021

(54) PNEUMATIC DEICING DEVICE FOR BREAKING AND REMOVING AN ICE DEPOSIT ACCUMULATED ON THE OUTER SURFACE OF AN AIRCRAFT

(71) Applicant: ZODIAC AEROSAFETY SYSTEMS, Plaisir (FR)

(72) Inventor: Valerie Briand, Saint-Ouen-du-Tilleul (FR)

(73) Assignee: ZODIAC AEROSAFETY SYSTEMS

( * ) Notice: Subject to any disclaimer, the term of this patent is extended or adjusted under 35 U.S.C. 154(b) by 772 days.

(21) Appl. No.: 15/841,871

(22) Filed: Dec. 14, 2017

(65) Prior Publication Data

US 2018/0178918 A1    Jun. 28, 2018

(51) Int. Cl.
  *B64D 15/16* (2006.01)
  *B29C 65/00* (2006.01)

(52) U.S. Cl.
  CPC .......... *B64D 15/166* (2013.01); *B29C 66/433* (2013.01); *B29C 66/729* (2013.01)

(58) Field of Classification Search
  CPC .................................................. B64D 15/166
  See application file for complete search history.

(56) References Cited

U.S. PATENT DOCUMENTS

| | | | | |
|---|---|---|---|---|
| 3,288,983 A | * | 11/1966 | Lear, Sr. ................ | B64D 15/12 219/522 |
| 3,370,814 A | * | 2/1968 | Uden ................... | B64D 15/166 244/134 R |
| 3,623,684 A | * | 11/1971 | Kline ................... | B64D 15/166 244/134 A |
| 4,336,291 A | * | 6/1982 | Broadhurst ...... | B60K 15/03177 428/101 |

(Continued)

FOREIGN PATENT DOCUMENTS

| | | |
|---|---|---|
| FR | 1271461 | 9/1961 |
| FR | 2749562 | 12/1997 |
| GB | 2279272 | 1/1995 |

OTHER PUBLICATIONS

Wu, Souheng. "Polymer Interface and Adhesion." Taylor & Francis Group. 1982. (Year: 1982).*

(Continued)

*Primary Examiner* — Philip J Bonzell
*Assistant Examiner* — Michael B. Kreiner
(74) *Attorney, Agent, or Firm* — Gerald E. Hespos; Michael J. Porco; Matthew T. Hespos

(57) ABSTRACT

A pneumatic deicing device (1) for breaking and removing an ice deposit accumulated on the outer surface (2) of an aircraft, in particular on an airplane wing. The device (1) includes an outer layer (10) intended to withstand the outside environment, an inner interface layer (50) intended to be bonded to the outer surface of the aircraft, and at least (Continued)

two outer (30) and inner (40) intermediate layers connected to one another by a network of stitches (36) spaced apart to define deicing chambers (35) that can be inflated using injected pressurized air so as to create an expansion of the device causing a mechanical action to break the ice. The inner interface layer (50) with the outer surface (2) of the aircraft includes at least one textile layer (54) having an inner surface (55) intended to be in direct contact with an outer surface (2) of the aircraft.

16 Claims, 1 Drawing Sheet

(56) References Cited

U.S. PATENT DOCUMENTS

| | | | |
|---|---|---|---|
| 4,463,919 A | 8/1984 | Bac | |
| 4,494,715 A * | 1/1985 | Weisend, Jr. | B64D 15/166 244/134 A |
| 4,561,613 A * | 12/1985 | Weisend, Jr. | B64D 15/166 244/134 A |
| 4,590,122 A * | 5/1986 | Levin | B04C 1/00 428/367 |
| 4,687,159 A * | 8/1987 | Kageorge | B64D 15/166 244/134 A |
| 5,112,011 A * | 5/1992 | Weisend, Jr. | B64D 15/166 244/134 A |
| 5,310,142 A * | 5/1994 | Weisend, Jr. | B64D 15/166 244/134 A |
| 5,337,978 A * | 8/1994 | Fahrner | B64D 15/166 244/134 A |
| 5,447,776 A | 9/1995 | Disselbeck | |
| 5,449,134 A * | 9/1995 | Weisend, Jr. | B29C 65/76 244/121 |
| 5,562,265 A * | 10/1996 | Rauckhorst, III | B64D 15/166 244/134 A |
| 5,571,352 A | 11/1996 | Disselbeck | |
| 6,247,669 B1 * | 6/2001 | Rauckhorst, III | B64D 15/166 244/134 A |
| 6,443,394 B1 * | 9/2002 | Weisend, Jr. | B64C 3/46 244/134 A |
| 6,520,452 B1 | 2/2003 | Crist et al. | |
| 6,733,845 B1 * | 5/2004 | Caramaro | B29B 15/105 427/477 |
| 9,011,981 B2 * | 4/2015 | Bonin | D06N 7/0068 427/474 |
| 9,994,324 B2 * | 6/2018 | Hu | C08K 3/042 |
| 9,994,325 B2 * | 6/2018 | Hu | B64D 15/16 |
| 9,994,326 B2 * | 6/2018 | Hu | B29C 70/42 |
| 2002/0084382 A1 * | 7/2002 | Crist | B64D 33/02 244/134 B |
| 2003/0122037 A1 * | 7/2003 | Hyde | B64D 15/166 244/134 A |
| 2009/0202764 A1 * | 8/2009 | Tonon | C09D 107/02 428/36.3 |
| 2012/0034833 A1 * | 2/2012 | Schaube | B29C 70/086 442/172 |
| 2017/0266753 A1 * | 9/2017 | Schomer | B29C 66/244 |
| 2017/0266869 A1 * | 9/2017 | Schomer | B29C 66/1122 |

OTHER PUBLICATIONS

Sen, Ashish Kumar. "Coated Textile—Principles and Applications." 2nd edition. Taylor & Francis Group. 2007. (Year: 2007).*
French Search Report dated Jun. 27, 2017.

* cited by examiner

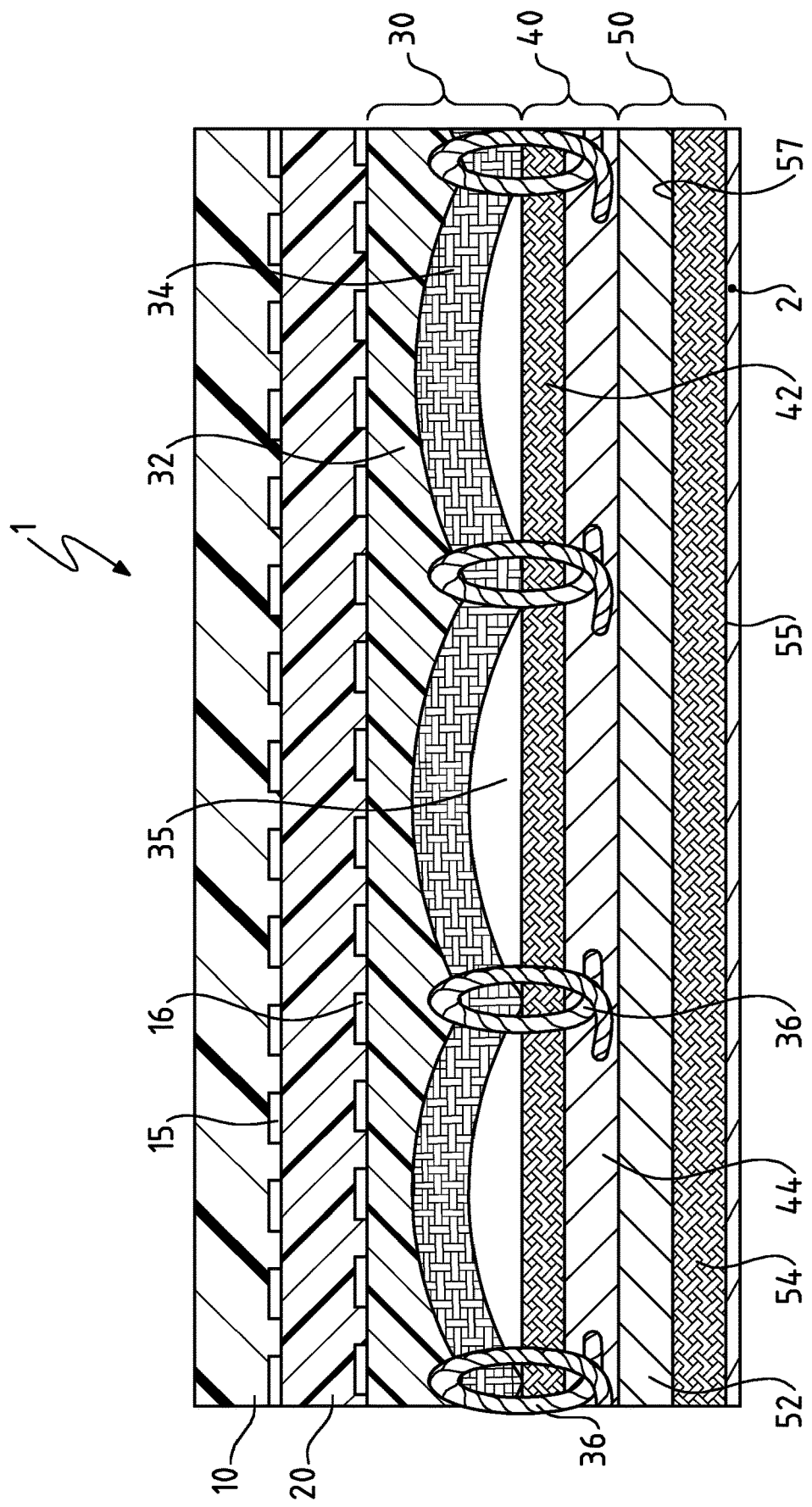

PNEUMATIC DEICING DEVICE FOR BREAKING AND REMOVING AN ICE DEPOSIT ACCUMULATED ON THE OUTER SURFACE OF AN AIRCRAFT

BACKGROUND

Field of the Invention

The present invention relates to a deicing device of the pneumatic type for breaking and removing an ice deposit accumulated on the outer surface of an aircraft.

Description of the Related Art

In particular, although not exclusively, the deicing device is intended to equip the wings, empennages, engine air intakes or other similar aircraft parts, for example for airplanes or helicopters.

It is known, when these aircraft traverse areas where the weather conditions are harsh and unfavorable, that ice may in particular form over the longer or shorter term on these aerodynamic surfaces, which may cause increased weight and a change in the aerodynamic profile of the wing that may modify the lift and drag. This can alter the in-flight behavior of the aircraft and subsequently cause malfunctions thereof that may have serious consequences for piloting. Thus, the surfaces can be equipped with deicing devices of the electric resistance or inflatable envelope type.

In the latter case, to which the invention relates, the known deicing devices generally include a flexible envelope that at least partially covers said surface and can inflate quickly. Thus, when ice forms on the aerodynamic surface, pressurized gas is sent into the envelope. The envelope then undergoes an abrupt expansion that causes the layer of ice to break into a plurality of pieces, then the ejection thereof on said surface. Such devices are in particular described in patent FR2749562A1 or patent US2002084382.

Yet these devices have a major drawback, since the flexible envelope, which is generally of the type with multiple layers, is heavy, in particular due to the use of an inner bonding layer with the outer surface of the aircraft that is very thick.

Yet efforts to reduce mass are a recurring theme in aeronautics, since reducing weight makes it possible to achieve substantial fuel savings, which is a plus with respect to the environment and operating costs.

One aim of the present invention is therefore to resolve the aforementioned problems and to propose a solution that is easy to implement, light and reliable, by modifying the gluing interface with the outer surface of the aircraft.

SUMMARY

Thus, the present invention relates to a deicing device of the pneumatic type for breaking and removing an ice deposit accumulated on the outer surface of an aircraft, in particular on an airplane wing, comprising at least:
- an outer layer intended to withstand the outside environment,
- an inner interface layer intended to be connected to the outer surface of the aircraft, preferably by gluing, and
- at least two outer and inner intermediate layers connected to one another by a network of stitches spaced apart so as to define deicing chambers that can be inflated quickly using injected pressurized air so as to create an expansion of the device causing a mechanical action to break the ice, characterized in that the inner interface layer with the outer surface of the aircraft includes at least one textile layer having an inner surface intended to be in direct contact with said outer surface of the aircraft.

According to preferred embodiments, the device according to the present invention comprises at least one of the following features:
- the textile layer of the inner interface layer is of the type belonging to the list comprising a net textile, a woven textile, and nonwoven textile obtained mechanically, by gluing or by welding, an inlaid web textile, a grid textile or a unidirectional (UD) fabric,
- the material making up the textile layer of the inner interface layer belongs to the list comprising polyamide, polyester, rayon, cotton, glass, polyethylene, polypropylene, aramid, para-aramid, polytetrafluoroethylene (PTFE), polyether ether ketone (PEEK), or carbon, or a combination of these materials,
- the textile layer of the inner interface layer has an outer surface treated with an adhering solution of the full bath type,
- the textile layer of the inner interface layer has an outer surface treated with a full bath adhering solution of the RFL (Resorcinol, Formol, Latex) type,
- the textile layer of the inner interface layer has an outer surface treated by a full bath adhering solution of the type with solution comprising isocyanates,
- the textile layer of the inner interface layer has an outer surface treated with a full bath adhering solution of the reactive resins type,
- the textile layer of the inner interface layer has an outer and/or inner surface treated by electrostatic treatment, for example of the Corona type, by atmospheric plasma or by fibroline,
- the inner interface layer includes, on the upper surface of the textile layer, a layer of rubber, preferably elastomer, for example a natural elastomer (NR), polyisoprene (IR), polybutylene (BR), chloroprene (CR), polyurethane (PU) or epichlorohydrin (ECO),
- the layer of rubber has a thickness from about 0.10 to 0.30 mm, and preferably from 0.15 to 0.25 mm,
- the inner intermediate layer includes an upper textile layer and a lower textile layer made from a material identical to that of the layer of rubber of the inner interface layer;
- the inner intermediate layer and the inner interface layer are stacked head to tail on one another, their respective rubber layers being connected to one another, preferably by co-vulcanization;
- the inner surface of the textile layer of the inner interface layer is not adhered, and
- the textile layer of the inner interface layer has a surface density below about 400 $g/m^2$, preferably below about 300 $g/m^2$ and advantageously less than about 120 $g/m^2$.

BRIEF DESCRIPTION OF THE DRAWING

FIG. 1 is a sectional view of the device according to the invention.

DETAILED DESCRIPTION

The FIGURES show a deicing device 1 of the pneumatic type for breaking and removing an ice deposit accumulated on the outer surface 2 of an aircraft, for example an airplane wing in the case at hand.

The device 1 includes, from the outside toward the surface 2 of the aircraft:

- an outer layer 10 intended to withstand the outside environment (fluids, abrasions, projected stones) and on which ice may become deposited. This outer layer 10 is typically made of polyurethane (PU), a polar elastomer making it possible to withstand fluids. More rarely, this outer layer 10 may be made from polychloroprene (CR);
- a layer 20 generally made from polychloroprene (CR) or gum (mixture of natural rubber (NR) and polychloroprene). It also requires the addition of a layer of glue 15 in order to bond it to the outer layer;
- an outer intermediate layer 30 including a layer 32 made up of natural rubber (NR) or polyisoprene (IR) or polybutylene (BR), which are non-polar rubbers, bonded to the layer 20 via a layer of glue 16, and a layer 34 of deformable textile knit that allows the inflation of the inner chambers 35 connected to a device for injecting pressurized air (not shown).
- an inner intermediate layer 40, forming the inflatable inner chambers 35 with the textile knit layer 34 of the outer intermediate layer 30. This inner intermediate layer 40 includes a textile layer 42, for example obtained by weaving, and a layer 44 preferably made from an elastomer, for example a natural elastomer (NR), polyisoprene (IR), polybutylene (BR), chloroprene (CR), polyurethane (PU) or epichlorohydrin (ECO). The outer 30 and inner 40 intermediate layers are connected to one another using a network of stitches 36 spaced apart to form the inner chambers 35 between them.
- an inner interface layer 50 intended to be bonded to the outer surface 2 of the aircraft, preferably by gluing its surface. This inner interface surface 50 includes a layer of rubber 52 and a textile layer 54, the inner surface 55 of which is glued to the outer surface 2 of the aircraft. To that end, the inner surface 55 may or may not be treated with an adhering solution.

The textile layer 54 is for example a knit layer, a woven layer, a nonwoven layer obtained mechanically, by gluing or by welding, an inlaid web textile, a grid textile or a unidirectional (UD) fabric. However, a textile layer obtained by weaving identical to the textile layer 42 will preferably be chosen. A woven material will be easier to impregnate/seal with glue compared to a knit, and will also be mechanically stronger (in particular in terms of tearing) than textile reinforcements of the nonwoven or UD or inlaid web or grid type.

The textile layer 54 is made up of a material belonging to the list comprising polyamide, polyester, rayon, cotton, glass, polyethylene, polypropylene, aramid, para-aramid, polytetrafluoroethylene (PTFE), polyether ether ketone (PEEK), or carbon, or a combination of these materials. Preference will be given to polyamide, which generally has good adherence and a lower cost than aramids or carbon.

The outer surface 57 of the textile layer 54 is treated using a full bath adhering solution, for example of the RFL (Resorcinol, Formol, Latex) type, with solution comprising isocyanates or reactive resins. This outer surface 57 may also have undergone electrostatic treatment, for example of the Corona type, by atmospheric plasma or by fibroline.

The textile layer 54 can be dyed, yarns dyed in the mass will also be able to be used for its composition.

The layer of rubber 52 is in turn preferably made up of an elastomer, for example a natural elastomer (NR), polyisoprene (IR), polybutylene (BR), chloroprene (CR), polyurethane (PU) or epichlorohydrin (ECO). This layer not being subject to the outside environment and not needing excellent cold elasticity, unlike the layer 32, which must be able to swell, many other elastomers may be appropriate.

The layer of rubber 52 has a thickness from about 0.10 to 0.30 mm, and advantageously from 0.15 to 0.25 mm (0.20 mm±0.05 mm). The thickness of this layer is optimized to make it possible to seal the stitches 36 while using the minimum mass necessary to perform this function without reducing the holding reliability upon cycling of the deicer.

Typically, it is possible to use a fabric with a maximum surface mass of 400 g/m$^2$ to produce the textile layer 54, knowing that beyond 300 g/m$^2$, the mass gain contributed is no longer truly significant for the application. In the proposed example, the textile layer 54 has a surface mass lower than 120 g/m$^2$. The elastomer layer 52 in turn has an optimized thickness; the total surface mass of the inner layer 50 is about 335 g/m$^2$, which represents a gain of 295 g/m$^2$ relative to the layer of the prior art, which has a surface mass of around 630 g/m$^2$.

The layer 40 is obtained by calendaring the layer 44 on the adhered textile 42.

Thus, the layer 50 may be obtained by using the material of the layer 40 in the opposite direction (head to tail), the two layers of elastomer 44 and 52 being bonded to one another, preferably by co-vulcanization. Thus, from an industrial perspective, the layers 40 and 50 can be made from the same material, which makes it possible to decrease the number of references.

The operation of the device 1 according to the present invention, when it is glued on the outer surface 2 of an aircraft, is as follows.

When a plate of ice has become deposited on the outer layer 10, a pressurized gas is injected into the inflatable chambers 35 so as to very quickly deform the textile layer 34 of the outer intermediate layer 30 under the effect of the injected gas. This abrupt mechanical action of the deicing device 1 breaks and expels said ice to the outside, such that the surface 2 of the aircraft is no longer subject to malfunctions. This inflation can be done repeatedly to optimize the breaking and expulsion of the ice. In general, there are two different cycles, a fast one and a slow one. Based on the deicing conditions (slow/low or fast/high accretion), either the slow mode or the fast mode will be chosen.

The solution thus described allows a non-negligible gain in weight owing to the use of a smaller number of layers and/or optimized management of their respective thicknesses and surface masses, while facilitating the production of the deicing device in the case where the layers 40 and 50 are identical and connected to one another head to tail.

It goes without saying that the detailed description of the object of the Invention, provided solely as an illustration, in no way constitutes a limitation, the technical equivalents also being comprised in the scope of the present invention.

Thus, the layers 32 and 44 can be made up of two layers.

What is claimed is:

1. A pneumatic deicing device (1) for breaking and removing an ice deposit accumulated on the outer surface (2) of an aircraft, comprising, from the outside in:
   - an outer layer (10) defining an outer surface of the deicing device and formed from a material selected to withstand an outside environment,
   - at least an outer intermediate layer (30) and an inner intermediate layer (40) connected to one another by a network of stitches (36) spaced apart so as to define deicing chambers (35) that can be inflated quickly using injected pressurized air so as to create an expansion of the device (1) causing a mechanical action to break the ice, and an inner interface layer (50) that includes at least one textile layer (54) situated farthest toward an inner side of the deicing device (1) and the at least one textile layer (54) has an inner surface (55) for direct contact with the outer surface (2) of the aircraft, the inner interface layer (50) being spaced from the stitches (36).

2. The device (1) of claim 1, wherein the textile layer (54) of the inner interface layer (50) is selected from the group comprising a knit textile, a woven textile, and nonwoven textile obtained mechanically, by gluing or by welding, an inlaid web textile, a grid textile or a unidirectional (UD) fabric.

3. The device (1) of claim 2, wherein the textile layer (54) of the inner interface layer (50) is made from polyamide, polyester, rayon, cotton, glass, polyethylene, polypropylene, aramid, para-aramid, polytetrafluoroethylene (PTFE), polyether ether ketone (PEEK), or carbon, or a combination of these materials.

4. The device (1) of claim 1, wherein the textile layer (54) of the inner interface layer (50) has an outer surface (57) treated with an adhering solution of the full bath type.

5. The device (1) of claim 4, wherein the textile layer (54) of the inner interface layer (50) has an outer surface (57) treated with a full bath adhering solution of the RFL (Resorcinol, Formol, Latex) type.

6. The device (1) of claim 4, wherein the textile layer (54) of the inner interface layer (50) has an outer surface (57) treated by a full bath adhering solution of the type with solution comprising isocyanates.

7. The device (1) of claim 4, wherein the textile layer (54) of the inner interface layer (50) has an outer surface (57) treated with a full bath adhering solution of the reactive resins type.

8. The device (1) of claim 1, wherein the textile layer (54) of the inner interface layer (50) has an outer surface (57) opposite the inner surface (55), at least one of the outer surface (57) and the inner surface (55) being treated by a Corona-type electrostatic treatment.

9. The device (1) of claim 1, wherein the inner interface layer (50) includes, on an outer surface (57) of the textile layer (54), a layer of rubber (52).

10. The device (1) of claim 9, wherein the layer of rubber (52) has a thickness from about 0.10 to 0.30 mm.

11. The device (1) of claim 10, wherein the inner intermediate layer (40) includes an upper textile layer (42) and a lower elastomer layer (44) made from a material identical to that of the layer of rubber (52) of the inner interface layer (50).

12. The device (1) of claim 11, wherein the inner intermediate layer (40) and the inner interface layer (50) are stacked in face-to-face contact with their respective rubber layers (52, 44) being connected to one another by co-vulcanization.

13. The device (1) of claim 9, wherein the inner surface (55) of the textile layer (54) of the inner interface layer (50) is not treated with an adhering solution.

14. The device (1) of claim 1, wherein the textile layer (54) of the inner interface layer (50) has a surface density below about 400 g/m$^2$.

15. The device (1) of claim 1, wherein the textile layer (54) of the inner interface layer (50) has an outer surface (57) opposite the inner surface (55), at least one of the outer surface (57) and the inner surface (55) being treated by an atmospheric plasma type of electrostatic treatment.

16. The device (1) of claim 1, wherein the layer of rubber (52) on the outer surface (57) of the textile layer (54) seals the stitches (36).

* * * * *